(12) United States Patent
Ng et al.

(10) Patent No.: US 8,631,198 B2
(45) Date of Patent: Jan. 14, 2014

(54) DYNAMIC CACHE REDUCTION UTILIZING VOLTAGE WARNING MECHANISM

(75) Inventors: Choon Wei Ng, Singapore (SG); Chee Meng Leong, Singapore (SG); Poh Guat Bay, Singapore (SG); June Christian Ang, Singapore (SG); Kian Keong Ooi, Singapore (SG); Wei Kin Wan, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 172 days.

(21) Appl. No.: 12/852,153

(22) Filed: Aug. 6, 2010

(65) Prior Publication Data

US 2012/0036328 A1 Feb. 9, 2012

(51) Int. Cl.
*G06F 12/00* (2006.01)
(52) U.S. Cl.
USPC ............ 711/113; 711/E12.021; 711/E12.046; 711/E12.073; 711/E12.017; 711/118
(58) Field of Classification Search
None
See application file for complete search history.

(56) References Cited

U.S. PATENT DOCUMENTS

| | | | |
|---|---|---|---|
| 5,386,526 A | 1/1995 | Mitra et al. | |
| 5,815,724 A * | 9/1998 | Mates ............................ | 713/322 |
| 6,621,043 B1 * | 9/2003 | Lambert et al. .......... | 219/121.69 |
| 6,629,201 B2 * | 9/2003 | Dempsey et al. ............. | 711/113 |
| 6,766,420 B2 * | 7/2004 | Rawson, III .................. | 711/133 |
| 7,111,129 B2 * | 9/2006 | Percival ......................... | 711/141 |
| 7,127,560 B2 * | 10/2006 | Cohen et al. .................. | 711/141 |
| 7,206,946 B2 | 4/2007 | Sakakibara et al. | |
| 7,296,166 B2 | 11/2007 | Sakakibara et al. | |
| 7,424,663 B2 | 9/2008 | Mehalel | |
| 7,532,539 B2 * | 5/2009 | Hirabayashi ............. | 365/230.06 |
| 8,103,830 B2 * | 1/2012 | Wilkerson et al. ............ | 711/118 |
| 2003/0061448 A1 * | 3/2003 | Rawson, III .................. | 711/133 |
| 2003/0120962 A1 * | 6/2003 | Dai et al. ....................... | 713/320 |
| 2006/0156048 A1 * | 7/2006 | Hines et al. ................... | 713/320 |
| 2006/0288159 A1 * | 12/2006 | Haruna et al. ................ | 711/113 |
| 2008/0005474 A1 * | 1/2008 | Long ............................. | 711/118 |
| 2008/0104324 A1 * | 5/2008 | Raghuvanshi ................ | 711/122 |
| 2009/0172283 A1 * | 7/2009 | Khellah et al. ................ | 711/118 |
| 2010/0082905 A1 | 4/2010 | Wilkerson et al. | |
| 2010/0191990 A1 * | 7/2010 | Zhang et al. .................. | 713/320 |
| 2010/0229012 A1 * | 9/2010 | Gaskins et al. ............... | 713/322 |

OTHER PUBLICATIONS

Chris Wilkerson et al., (Trading Off Cache Capacity for Reliabilty to Enable Low VOltage Operation), Microprocessor Technology Lab, Intel Corporation, University of Central Florida, pp. 1-12, Jan. 16, 2009, http://web.archive.org/web/20090116012036/http://pages.cs.wisc.edu/~alaa/papers/isca08_vccmin.pdf.*

* cited by examiner

*Primary Examiner* — Edward Dudek, Jr.
*Assistant Examiner* — Christopher Birkhimer
(74) *Attorney, Agent, or Firm* — HolzerIPLaw, PC

(57) ABSTRACT

An interface controller of a storage device configured to manage a write cache of the storage device responsive to changes in a voltage supply provided to the storage device. In one implementation, the interface controller reduces the size of the write cache responsive to the voltage supply dropping at or below a first threshold. The interface controller further disables write permissions to the write cache responsive the voltage supply dropping at or below a second threshold, wherein the second threshold is lower in magnitude that the first threshold. The interface controller periodically receives the voltage supply responsive to transmitting sequential requests to a servo firmware of the storage device.

21 Claims, 7 Drawing Sheets

DYNAMIC CACHE REDUCTION UTILIZING VOLTAGE WARNING MECHANISM

SUMMARY

Implementations described and claimed herein address the foregoing problems by managing the size of write cache of a storage device in response to changes in a voltage supply level supplied to the storage device.

Other implementations are also described and recited herein.

BRIEF DESCRIPTIONS OF THE DRAWINGS

DETAILED DESCRIPTIONS

Figure 1:
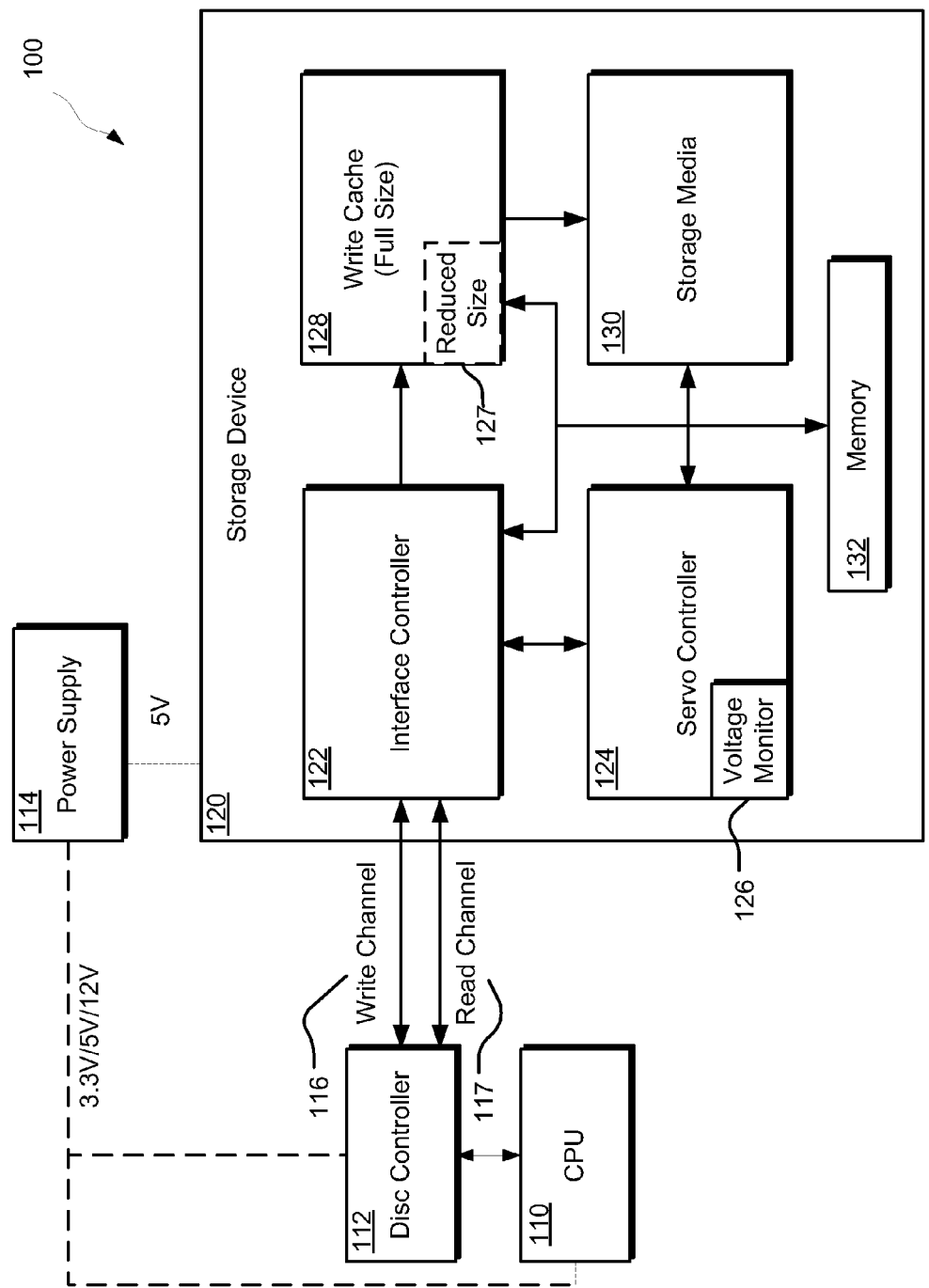
FIG. 1 illustrates an example of a computing system incorporating a voltage monitoring system.

Storage devices, such as hard disk drives (HDD) and solid state drives (SSD), exist in computers in order to store information such as the operating system used by the computer, software applications and their data, emails, media, amongst other data. Information is continuously read from and written to a storage device. When a storage device receives a request to write information to the storage medium, the storage device determines where the information is to be physically stored on the medium. In the case of a hard disc drive, when the storage device determines a suitable location to store the data, a read/write transducer is moved, by an actuator, to the physical location on the storage medium where the information will be written. The time required 1) to determine a location to store the information; and 2) move the transducer to the desired location (e.g., seek time) may be up to 10 milliseconds (ms). Computer performance may be drastically affected if the computer has to wait up to 10 ms for each write request that occurs during normal computing.

Accordingly, storage devices are equipped with a write cache or buffer to address the problem of degraded performance during a write request. In one implementation, a write cache is a temporary storage medium, embedded into the storage device, where data can be temporarily stored before being written to the storage medium. A write cache may be comprised of random access memory (RAM), such as direct random access memory (DRAM) or static random access memory (SRAM). Reading and writing data stored in RAM is significantly faster than traditional platter-based hard disc drives. However, RAM is a volatile memory, which means that a constant power source is used to maintain the data stored in the memory. Hence, once the computer is turned off or loses power, the storage device's write cache is erased. Further, a minimum voltage supply level may be needed to maintain proper operation of a storage device's cache. In other words, if the voltage supply level is too low, yet power to the storage device still exists, the date stored in the write cache may be erased or become unreadable.

An additional concern with using RAM as a storage medium is the cost. Currently, the cost per gigabyte of RAM is significantly higher than the equivalent cost for hard disc drives, which have eclipsed two terabytes in size. In one implementation, the size of a write cache is between 8 and 16 megabytes (MB) with sizes as high as 32 MB, although write cache sizes outside of this range may be employed.

When a storage device utilizes a write cache, data from a write request may be written to the write cache before being persistently written to a storage medium. The write cache does not have the same seek time delays (e.g., time spent moving a read/write transducer to a desired read or write location) before data can be stored to the cache, as compared to hard disk drives. Once the data has been written to the write cache, the computer connected to the storage device does not need to wait for the data to be persistently written to the storage medium. In one implementation, the computer is unaware that the data still resides in the write cache, and has not yet been persistently written to the storage medium. At this point, the data can be moved from the write cache (e.g., flushed from the cache) to the storage device's non-volatile storage medium, without degrading performance of the computer. The write cache can be erased once the data is written to the non-volatile storage medium.

One concern with the use of volatile RAM in a write cache relates to a decrease or loss of power to the computer and storage device. As previously stated, data stored in volatile memory may be lost when power to the memory is shut down or if the voltage supply drops below a sufficient level for maintaining power to the memory. During a substantial decrease or loss of the voltage supply, the data in the write cache may be erased before being permanently written to the storage medium. In result, the data actually written to the storage medium and the data in the computer's operating system may differ. When the computer's operating system subsequently attempts to access data that was never written to the storage medium, errors may result in the form of a system fault when running an application. Additionally, the operating system may reboot the computer because it could not understand the data from the disk.

FIG. 1 illustrates an example of a computing system 100 incorporating a voltage monitoring system. Computing system 100 comprises at least a CPU 110, a disc controller 112, and a storage device 120 all of which receive power from a power supply 114. In one implementation, the power supply 114 provides a 5 Volt (V) supply to the storage device 120. The power supply 114 may supply one or more varying voltage levels to each of the CPU 110, disc controller 112, and additional components (not shown.) In one implementation, one or more of the voltage levels supplied to each device may be 3.3V, 5V, or 12V, although other voltage level may be provided.

The CPU 110 communicates with the storage device 120 in order to write to and access data stored in the storage device 120. The CPU 110 communicates with the storage device 120 through one or more write channels 116 or write channels 117 connected to the interface controller 122 of the storage device 120. In one implementation, the read channels 117 and write channels 116 couple to the CPU 110 through the disk controller 112. One skilled in the art can appreciate that differing architectures may exist for permitting the CPU 110 to communicate with the storage device 120.

Storage device 120 comprises an interface controller 122, a servo controller 124, a write cache 128, and a storage medium 130. The servo controller 124 also includes a voltage monitor 126. In one implementation, the servo controller 124 may include a combination of one or more application specific integrated circuits (ASIC) and firmware (F/W) modules. In another implementation, the servo controller 124 is an ASIC wherein the voltage monitor 126 is part of the ASIC. In another implementation, the voltage monitor 126 may be external to the servo controller 124. Additionally, the interface controller 122 may include a combination of one or more ASICs (e.g., hardware), firmware, and software modules.

In one implementation, interface controller 122 is responsible for communicating write requests from the CPU 110, to the storage device 120. When a write request is sent from the CPU 110 to the storage device, the interface controller 122 intercepts the data from the write request and places it in the write cache 128. As previously stated, the write cache 128 temporarily holds the data to be written to the storage medium 130 to increase performance of the computer. In other words, since the data can be written to the write cache 128 much faster than the storage medium 130, the CPU 110 does not need to wait for the data to be persistently written to the storage medium 130 before proceeding to other operations. As stated above, the time spent determining a write location on a storage medium, as well as the time spent moving a read/write actuator (e.g., seek time) to the desire location, can be lengthy. If the CPU 110 waits for these steps to occur before proceeding to other operations, CPU performance decreases. Once data is written to the write cache 128, the interface controller 122 communicates to the CPU 110 that the data has been successfully written. However, the interface controller 122 does not distinguish between the data existing in the write cache 128 or being persistently written to the storage medium 130. Further, the interface controller 122 may not communicate to the CPU 110 once the data has been moved from the write cache 128 to the storage medium. Thus, the CPU 110 may be unaware that the data is temporarily stored in a volatile memory of the write cache 128.

The data stored in the write cache 128 is flushed from the write cache 128 once the desired write location of the storage medium 130 has been determined and the read/write actuator has been physically moved to the desired location. In one implementation, flushing of the cache means that the data stored in the write cache 128 is copied to the storage medium 130 and removed from the write cache 128. In one implementation, the write cache 128 may be a non-volatile memory.

Amongst other responsibilities, the servo controller 124 monitors the voltage level, through the voltage monitor 126, of the supply voltage coming from the power supply 114. In one implementation, the voltage monitor 126 uses an analog-to-digital converter (ADC) to monitor the power supply voltage at regular intervals (e.g., at each servo wedge.) In one implementation, having knowledge of the power supply 114 voltage level allows for the interface controller 122 to compensate if a drop in voltage occurs. As previously stated, any data stored in the write cache 128 will be lost if power to the storage device 120 is interrupted, or if the voltage supply level drops too low. Additionally, the CPU 110 would be unaware that data is lost since the interface controller 122 communicates to the CPU 110 that the data has been persistently written, even if data remains in the write cache 128. As such, a comparison between the data actually written to the storage medium and the data the CPU 110 expects to have been written may differ.

One implementation for addressing this scenario permits for reducing the size of the write cache if a reduction in the power supply 114 voltage level is detected. In other words, if a write cache size is reduced 127 (as indicated by the dashed-line block) the amount of potentially lost data is reduced. Further, if the power supply 114 voltage level continues to drop, the reduced write cache 127 may be flushed, faster than the originally write cache 128, with no loss of data. Further details of this implementation will be subsequently provided in regards to FIGS. 5-7.

A power loss may occur within a few milliseconds. However, this timeframe may be sufficient for the interface controller 122 to 1) reduce the write cache size; 2) flush the write cache; and 3) disable additional writes to the write cache, such that data is not lost due to the power failure. In order for the storage device 120 to determine if a voltage drop occurs, the interface controller 122 may send requests to the servo controller 124, at regular intervals, to obtain the current power supply 114 voltage level being fed to the storage device 120. Under normal circumstances, the interface controller 122 communicates with the servo controller 124 through concurrent requests. A concurrent request is placed in a queue where the request is answered based on one or more priority levels. In one implementation, first-in, first-out (FIFO) priority is used where the newest request is sent to the back of a queue and answered once all the earlier requests are answered first. Under normal read and write circumstances, such a priority scheme is sufficient. However, when access to the power supply 114 voltage level is quickly needed, concurrent requests are insufficient. A sequential request may be used to overcome this limitation. Such requests are given the highest priority by the servo controller 124, such that the servo controller 124 processes these requests before completion of an existing concurrent request. In other words, a sequential request provides for a near-instant response from the servo controller 124.

If a drop in the voltage supply level is received by the interface controller 122, the size of the write cache 128 may be reduced in anticipation of an impending power loss. If the size of the write cache 128 is reduced, the time needed for subsequently flushing the reduced write cache 127 is also reduced. In one example, the write cache 128 of a storage device 130 may be 8 MB. If the write cache is reduced to 256 KB, a 96% reduction in cache size results. As such, it takes significantly less time to flush the reduced cache 127 during an impending power loss. Once the cache size is reduced, the CPU 110 may continue to write to the reduced write cache 127. If the power supply's voltage level continues to drop, the reduced write cache 127 may be quickly flushed in sufficient time before the voltage level drops too low, or a complete power loss results. In one implementation, it would take roughly 5 ms to flush a 256K cache. It is noted that the original size of the write cache 128 and the reduced size of the write cache 127 are merely examples. Additional original and reduced write cache sizes may be used without altering the scope of the invention. As such, those skilled in the art can appreciate that other values and ranges may be used. In one implementation, the interface controller 122 is responsible for reducing the size of the write cache 128, flushing the write cache 128, and revoking the CPU's 110 write permissions or operations to the write cache 128.

In at least one implementation, alerting the cache size involves communication between the interface controller and the CPU. When a CPU requests to write data to a storage device, the storage device's interface controller is responsible for receiving the data and placing it in the write cache until the data is ready to be persistently written to the storage medium. If the CPU's write request is smaller than or equal to the current size of the write cache, the entirety of the request may be accepted. If, however, the write request is larger than the size of the write cache, or larger than the available portion of the write cache, the interface controller only accepts a portion of the data to be written, wherein the portion is less than or equal to the size of the available cache. Once the write cache is flushed to the storage medium, the remaining portion of the data may be accepted by the interface controller.

Alternatively, if the write request is larger than the size of the write cache, or larger than the available portion of the write cache, the interface controller may deny the entirety of the write request until the write cache has been flushed. In one implementation, the interface controller may periodically communicate to the CPU the available size of the write cache, such that the CPU knows how much data may be written to the storage device at one time. Hence, the interface controller continues to provide a maximum cache size amount to the CPU depending on the size of the write cache. For example, if the write cache is at an original size, the interface controller may periodically communicate to the CPU that it may write up to 8 MB of data to the storage device. On the other hand, if the write cache size is reduced to 256 KB, the interface controller may periodically communicate to the CPU that it may only write up to 256 KB of data to the storage device.

In another implementation, the interface controller may not communicate the available size of the write cache to the CPU. In contrast, the interface controller may simply respond to write commands from the CPU as being acceptable for writing or not acceptable for writing to the write cache. For example, if the current write cache has 512 KB of free space and the CPU attempts to write 768 KB of data, the interface controller does not accept or allow the write command. The CPU then waits until the interface controller flushes the cache and communicates to the CPU that the data may now be written. Alternatively, if the write command from the CPU is 386 KB, the interface controller will allow the data to be written to the write cache. In such an embodiment, the CPU is unaware of the available cache size. Instead, the CPU receives communications from the interface controller as to whether the present write command is allowed.

In another implementation, the storage device 120 may be a solid state drive. Although the storage medium 130 between a hard disc drive and a solid state drive differ, the benefits of an interface controller configured to monitor a write cache size still remain. In such an implementation, the interface controller 124 may still reduce the size of the write cache 128 to a reduced write cache size 127. Additionally, the interface controller may further disable the write cache of a solid state drive. In another embodiment, a hybrid storage device may benefit from a dynamically managed write cache size. A hybrid storage device consists of both a hard disc drive and a solid state drive.

Figure 2:
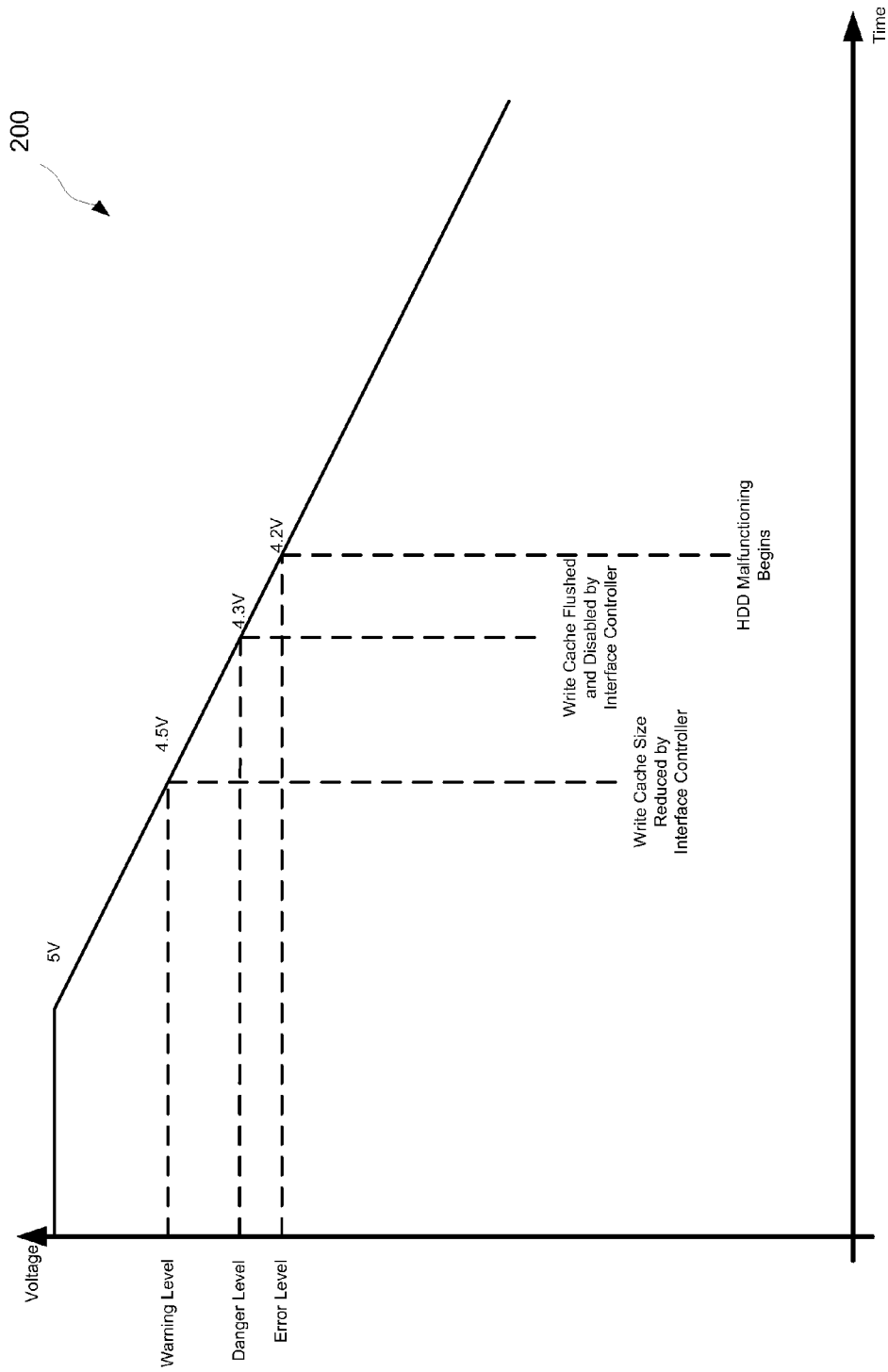
FIG. 2 illustrates an example graph of a drop in voltage and the actions that follow.

FIG. 2 illustrates an example graph 200 of a drop in voltage and the actions that follow. The graph 200 shows voltage on the Y-axis and time across the X-axis. In the illustrated example, 5V is the expected voltage level to a hard drive. If the voltage drops to 4.5V, a Warning Level threshold is reached. At this point, an interface controller reduces the size of a write cache by some margin. As previously mentioned, the write cache 128 may be reduced from 8 MB to 256 KB, or some other variation of original and reduced cache sizes. Once the cache size is reduced, a CPU may continue to write to the reduced write cache, as long as the voltage stays above a Danger Level threshold. If, however, the voltage drops below 4.3V, a Danger Level threshold is reached. At the Danger Level threshold, the interface controller flushes the reduced write cache and prevents additional writes to the reduced write cache in anticipation of a power loss. In one implementation, the minimum usable voltage level of a storage device is 4.2V (e.g., Error Level). Below 4.2V, a storage device's ability to read and write data diminishes with potential errors occurring. It is noted that the Warning Level and Danger Level thresholds of 4.5V and 4.3V, respectively, is only an example. As such, based on this description, those skilled in the art can appreciate that other values and ranges may be used.

If the voltage supply level recovers from a drop to the Danger Level threshold (e.g., 4.3V), the interface controller may re-enable write operations to the write cache. Additionally, if the voltage increases above the Warning Level threshold (e.g., 4.5V), the interface controller may increase the size of the reduced write cache. The cache size may be increased to its original size or some variation of the original size. In another implementation, multiple warning levels may correspond to multiple cache sizes. For example, if the voltage drops to 4.7V, the size of the write cache may be reduced by 50% (from 8 MB to 4 MB). If the voltage drops to 4.6V, the size of the write cache may drop by an additional 75% (from 4 MB to 1 MB). As such, a multitude of associations between voltage levels and cache sizes may be used. The illustration used in FIG. 2 is merely an example association between voltage thresholds, cache sizes, and protective actions.

Figure 3:
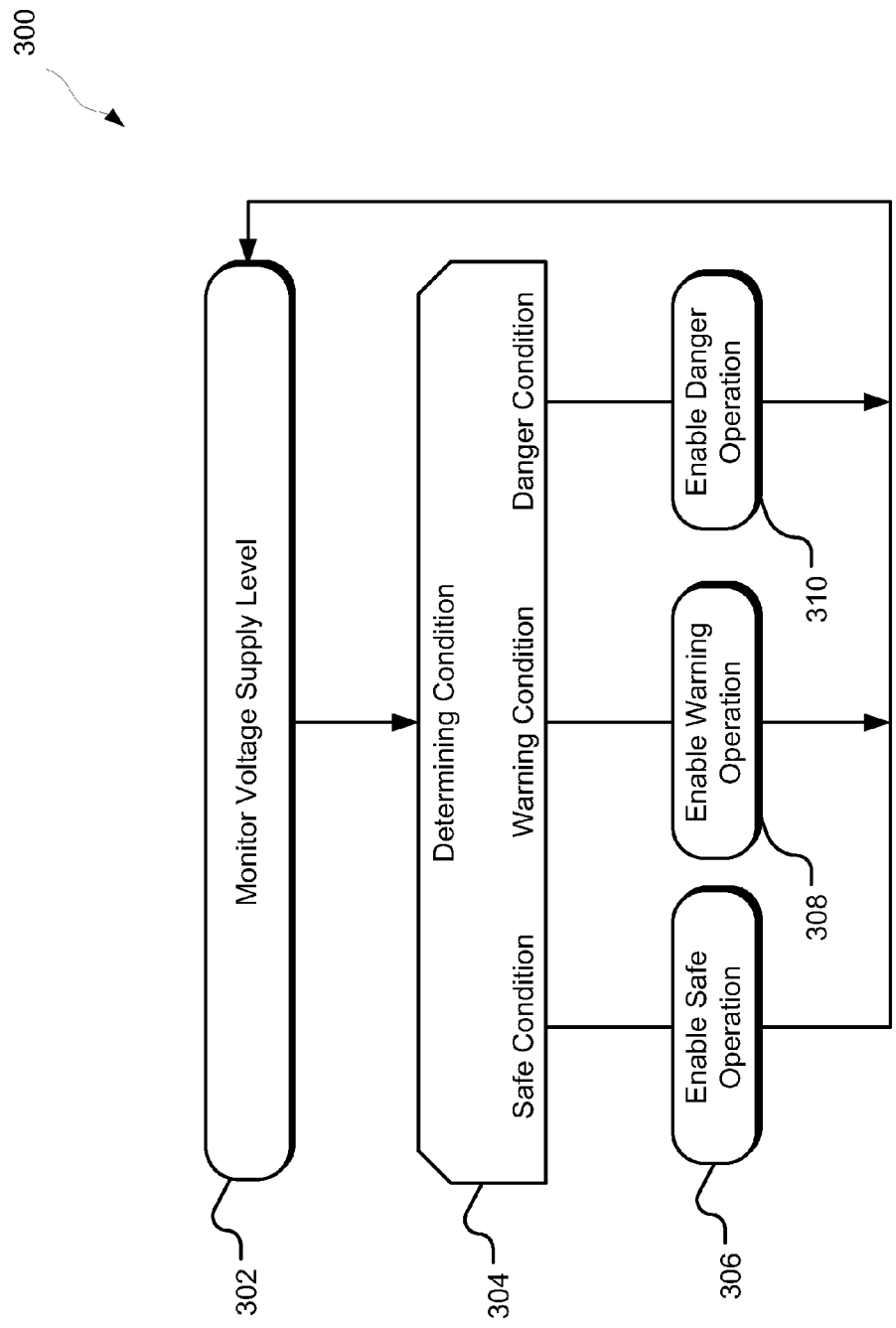
FIG. 3 illustrates example operations for controlling a write cache of a storage device.

FIG. 3 illustrates example operations 300 for controlling a write cache of a storage device. In one implementation, an interface controller of a storage device performs some or all of the operations involved in controlling a write cache. A monitoring operation 302 monitors a voltage supply level supplied to the storage device. In one implementation, an interface controller may periodically communicate, through read and write channels, a sequential request to a servo controller. Upon receipt of a sequential request, the servo controller transmits a current voltage supply level to the interface controller. In one implementation, the interface controller may communicate a sequential request to the servo controller every millisecond. However, differing interval times may be used without deviating from the benefit of sequential requests. As previously stated, the servo controller may respond to a sequential request before completion of a current concurrent request. Thus, the interface controller receives the voltage supply level without waiting for the servo controller to process other requests which were received earlier in time. In other words, the sequential request bypasses the request queue, where concurrent requests are placed, and receives immediate priority by the servo controller.

Upon receipt of the current voltage supply level, a determination operation 304 determines whether the current voltage supply level is within a safe condition, a warning condition, or a danger condition. Determining operation 304 further directs processing to the appropriate operation, based on the voltage supply level. An enable safe operation 306 increases the cache size, if the voltage supply level in within the safe condition. In the cache size is already at an original size, the enable safe operation 306 does not make any changes to the write cache. Once the increase operation 306 completes, processing returns to initial monitoring operation 302. An enable warning operation 308 may alter the size and state of the cache, depending on the previous state and size of the cache. For example, the enable warning operation 308 reduces the cache size, if the voltage supply level is within the warning condition, and the cache size it at the original size. Alternatively, the enable warning operation 308 re-enables write caching, if the cache was previously disabled. Lastly, the enable warning operation 308 does not make any changes if the write cache is already at a reduced size and enabled. Once the enable warning operation 308 completes, processing returns to the initial monitoring operation 302. An enabled danger operation 310 disables the write cache, if the voltage supply level in within the danger level and the cache was previously enabled. Alternatively, the enabled danger operation 310 does not perform any operations if the cache was previously disabled. Once the enable danger operation 310 completes, processing returns to the initial monitoring operations 302. Details of the enable safe, enable warning, and enabled danger operations are described below with respect to FIGS. 5-7.

Figure 4:
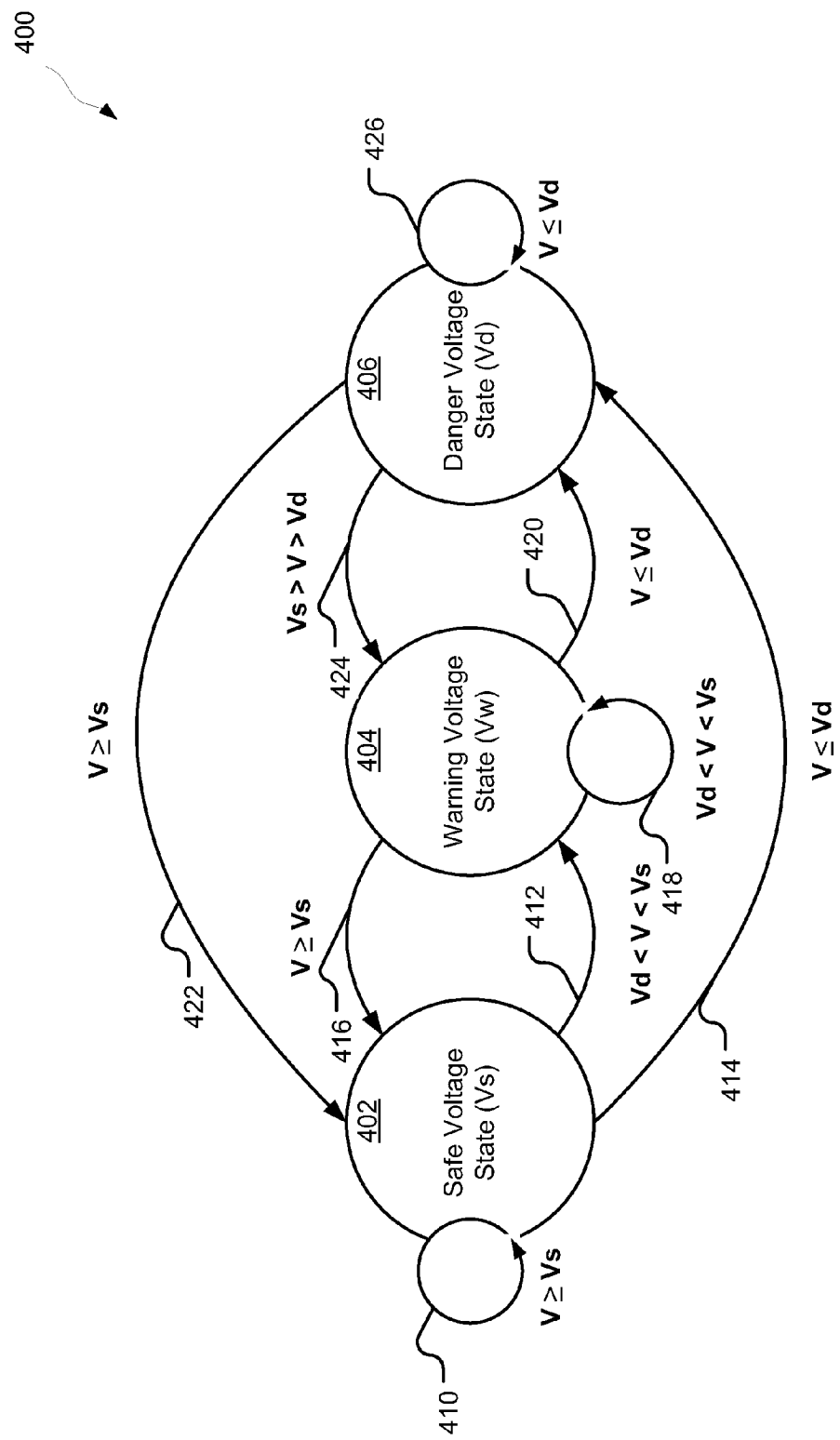
FIG. 4 illustrates example operations for controlling a write cache of a storage device depending on a voltage state.

FIG. 4 illustrates example operations for controlling a write cache of a storage device depending on a voltage state. In one implementation, an interface controller may utilize a state machine to determine a current voltage condition. The state machine 400 may be implemented in hardware, firmware, software, or any combination of the three. The state machine 400 comprises three states: a safe voltage state 402, a warning voltage state 404, and a danger voltage state 406. Vs represents a safe voltage threshold. For example, Vs may represent a voltage greater than or equal to 4.5V. Thus, if a voltage supply condition (V) is greater than or equal to 4.5V, the state machine 400 is in a safe voltage state 402. Vw represents a warning voltage threshold, wherein Vw may represent a voltage less than 4.5V, but greater than or equal to 4.3V. Thus, if the voltage supply condition is less than 4.5V, but greater than or equal to 4.3V, the state machine 400 is in a warning voltage state 404. Vd represents a danger voltage threshold, wherein Vd may represent a voltage less than 4.3V, but greater than or equal to 4.2V. Thus, if the voltage supply condition is less than 4.3V, but greater than or equal to 4.2V, the state machine 400 is in a danger voltage state 406.

Each of the three states may transition between one of the other states or remain in the same state. For example, if the state machine 400 is currently in the safe voltage state 402, the state machine 400 may transition to the warning voltage state 404, the danger voltage state 406, or remain in the safe voltage state 402. If V is greater than or equal to Vs, the state machine 400 remains in the safe voltage state as shown by transition 410. If V is less than Vs and greater than Vd, the state machine 400 transitions to the warning voltage state 404 as shown by transition 412. If V is less than or equal to Vd, the state machine 400 transitions to the danger voltage state 406 as shown by transition 414.

If the state machine 400 is currently in the warning voltage state 404, the state machine 400 may transition to the safe voltage state 402, the danger voltage state 406, or remain in the warning voltage state 404. If V is greater than or equal to Vs, the state machine 400 transitions to the safe voltage state 402 as shown by transition 416. If V is less than Vs and greater than Vd, the state machine 400 remains in the warning voltage state 404 as shown by transition 418. If V is less than or equal to Vd, the state machine 400 transitions to the danger voltage state 406 as shown by transition 420.

If the state machine 400 is currently in the danger voltage state 406, the state machine 400 may transition to the safe voltage state 402, the warning voltage state 404, or remain in the danger voltage state 406. If V is greater than or equal to Vs, the state machine 400 transitions to the safe voltage state 402 as shown by transition 422. If V is less than Vs and greater than Vd, the state machine 400 transitions to the warning voltage state 404 as shown by transition 424. If V is less than or equal to Vd, the state machine 400 remains in the danger voltage state 406 as shown by transition 426. If the state machine 400 is in the safe voltage state 402, the operations illustrated in FIG. 5 may execute. Alternatively, if the state machine 400 is in the warning voltage state 404, the operations illustrated in FIG. 6 may execute. Lastly, if the state machine 400 is in the danger voltage state 406, the operations illustrated in FIG. 7 may execute.

Figure 5:
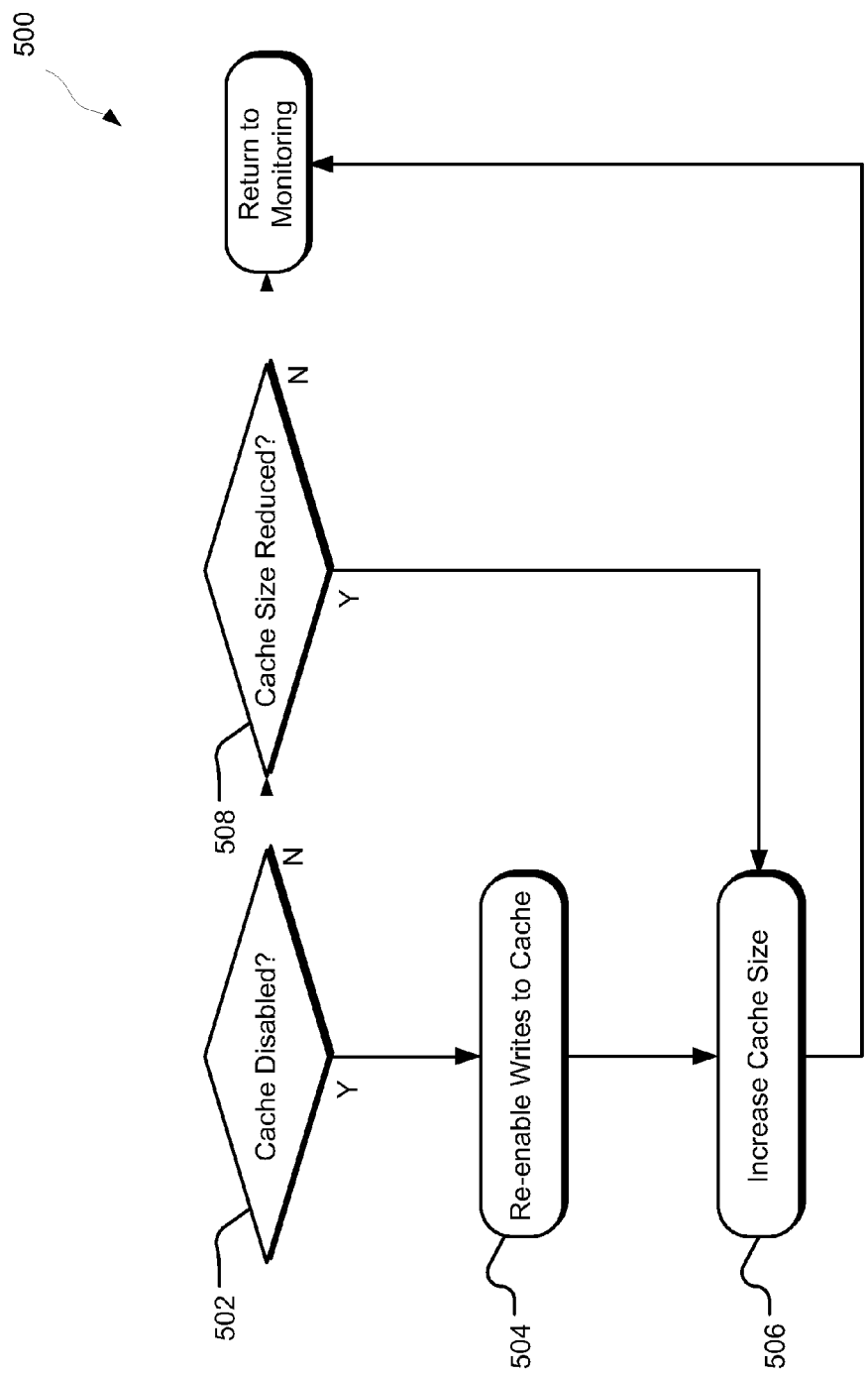
FIG. 5 illustrates example operations for managing a write cache during a normal voltage supply level supplied to a storage device.
Figure 6:
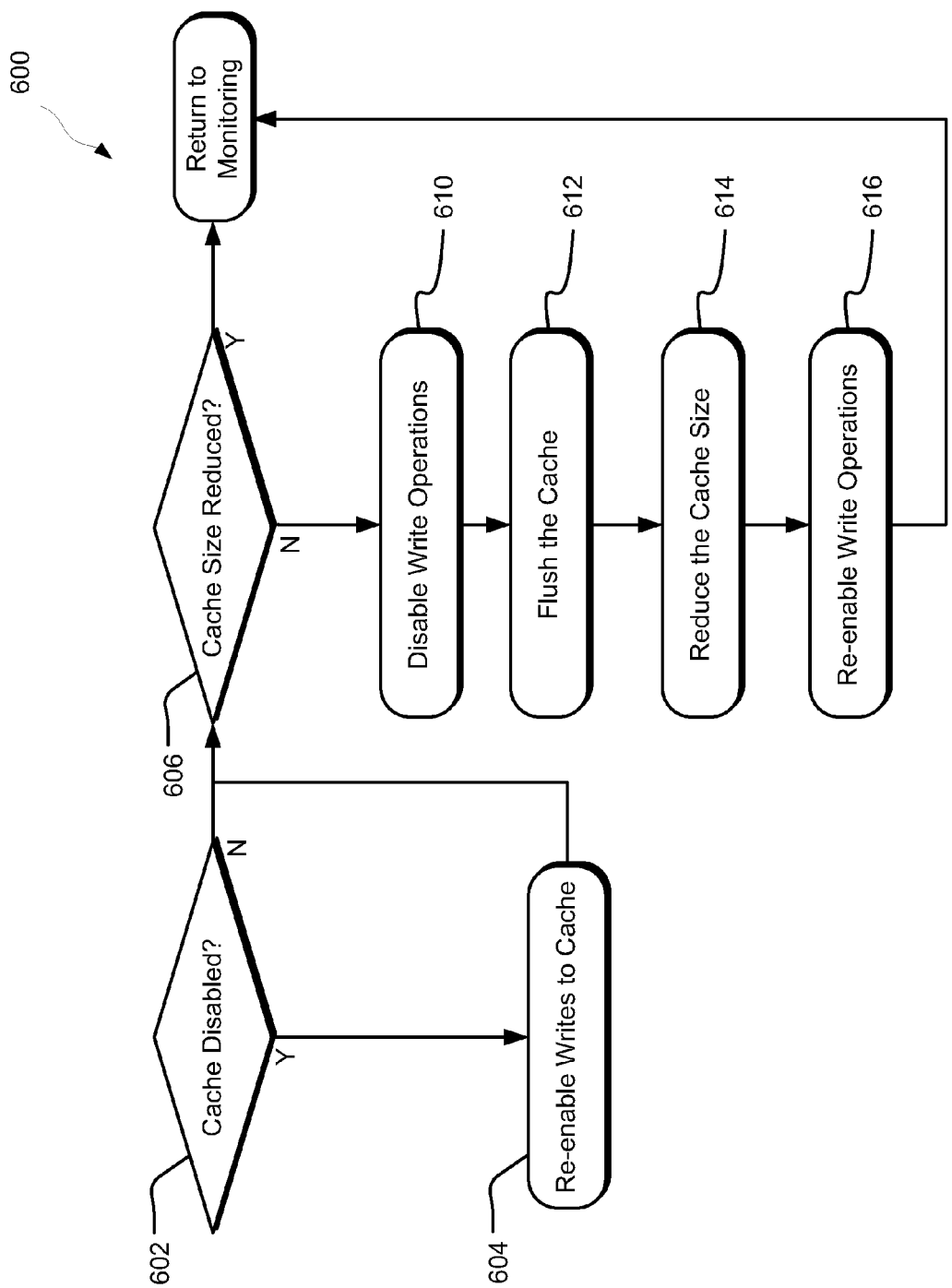
FIG. 6 illustrates example operations for managing a write cache during a first decrease in a voltage supply level supplied to a storage device.
Figure 7:
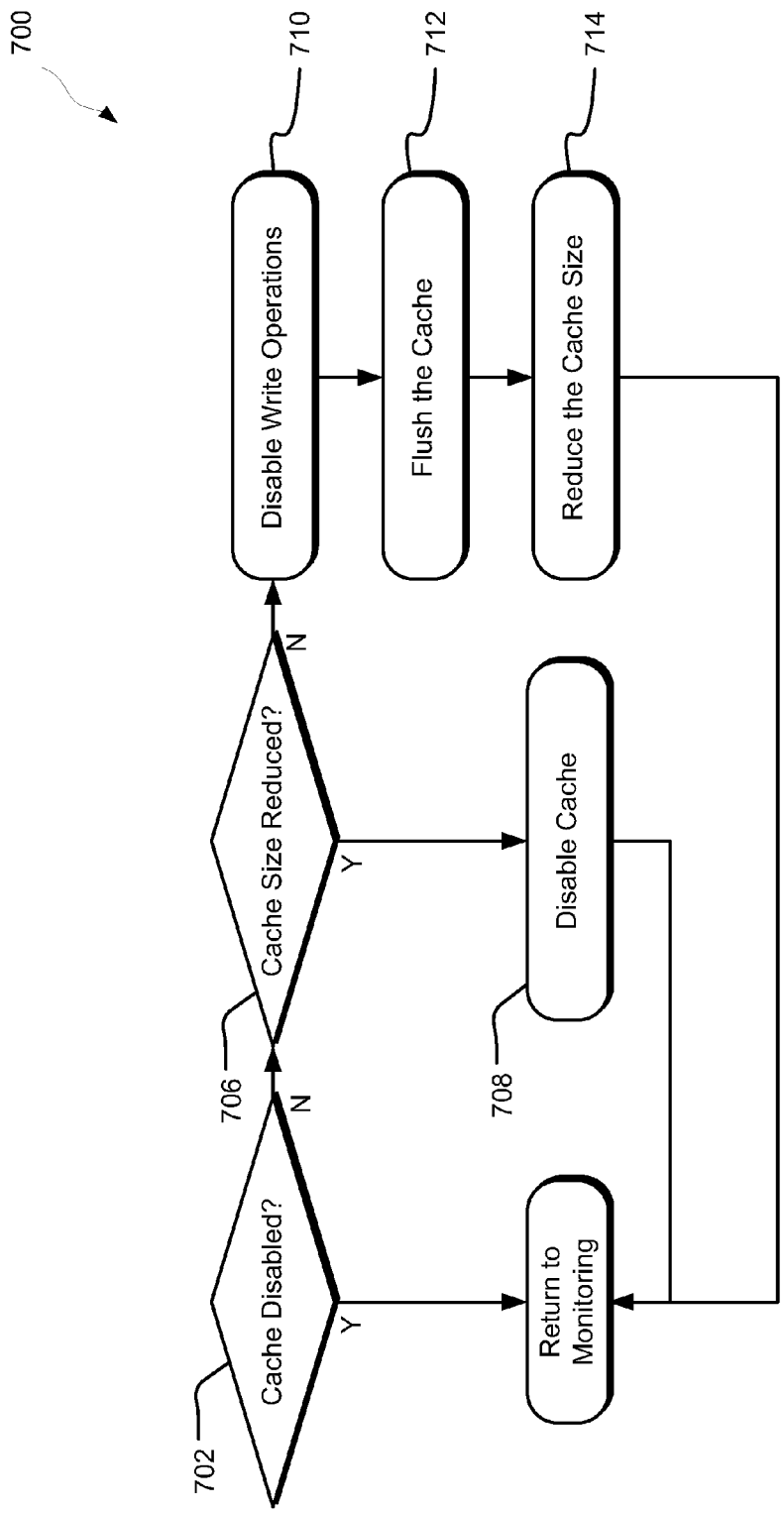
FIG. 7 illustrates example operations for managing a write cache during a second decrease in a voltage supply level supplied to a storage device.

FIGS. 5-7 illustrate example operations for managing a write cache depending on the current voltage supply level supplied to a storage device. When a current voltage supply level is received, the current state of the write cache is considered before any operations occur. For example, if the voltage supply level is at or below a warning level threshold, different operations may result whether 1) the cache is in a reduced size; 2) write permissions to the cache are disabled; or 3) the cache size is in its original size.

FIG. 5 illustrates example operations 500 for managing a write cache during a normal voltage supply level supplied to a storage device. In one implementation, operations 500 are performed when the voltage supply level is greater than a safe level threshold, wherein the safe level is 4.5V. Other voltage values may be used to represent a safe level threshold. A decision operation 502 determines whether the write cache is disabled (e.g., write operations have been disabled with respect to the write cache.) If the write cache is disabled, a re-enable operation 504 re-enables the write cache such that a CPU may resume writing information to the write cache. Next, an increase operation 506 increases the size of the write cache. In one implementation, the size of the write cache is increases to the original size or some variation of the original size. Since, the write cache was previously disabled, it is likely that the size of the write cache had been previously reduced as well. Next, processing returns to a voltage monitoring operation. In another implementation, the order of the re-enable operation 504 and the increase operation 506 may be reversed. In other words, the size of the write cache may be increased 506 before write operations are re-enabled 504. Returning to operation 502, if the cache is not disabled, a decision operation 508 determines whether the size of the write cache has been reduced. If the size of the write cache has not been reduced, the operations return to the voltage monitoring operation. If the size of the write cache has been reduced, the increase operation 506 increases the size of the write cache to the original size or some variation thereof. Lastly, processing returns to the voltage monitoring operation.

FIG. 6 illustrates example operations 600 for managing a write cache during a first decrease in a voltage supply level supplied to a storage device. In one implementation, operations 600 are performed when the voltage supply level is less than or equal to a warning level threshold, wherein the warning level is 4.3V. Other voltage values may be used to represent a warning level threshold. A decision operation 602 determines whether a write cache is disabled (e.g., write operations have been disabled with respect to the write cache.) If the write cache is disabled, a re-enable operation 604 re-enables the write cache such that a CPU may resume writing information to the write cache. Once the write cache has been re-enabled, or if the write cache was not disabled, a decision operation 606 determines if the size of the write cache has been reduced. If the size of the write cache was in a reduced state, processing returns to a voltage monitoring operation.

If the size of the cache had not been reduced, a number of operations decrease the size of the write cache. A disable operation 610 disables write operations to the write cache. In one implementation, write operations are disabled through a notification communicated to a CPU that writes to the write cache are not permitted. Next, a flush operation 612 flushes the write cache of its contents. In one implementation, the write cache is flushed by copying its contents to a storage medium, such as a hard disc, and deleting the contents from the write cache. Once the write cache is flushed, a reduce operation 614 reduces the size of the write cache. In one implementation, the physical size of the write cache does not change. Instead, an interface controller may only accept a reduced amount of data to be written to the write cache. In other words, if the interface controller reduces the size of the write cache from 8 MB to 256 KB, only 256 KB of data will be accepted for inclusion in the write cache. Once, the size of the write has been reduced, a re-enable operation 616 re-enables write operations to the write cache through a notification communicated to the CPU that writes to the write cache are permitted. Lastly, processing returns to a voltage monitoring operation.

FIG. 7 illustrates example operations for managing a write cache during a second decrease in a voltage supply level supplied to a storage device. In one implementation, operations 700 are performed when the voltage supply level is less than or equal to a danger level threshold, wherein the danger level threshold is 4.2V. Other voltage values may be used to represent a danger level threshold. A decision operation 702 determines if a write cache is disabled. If the write cache is disabled, processing returns to a voltage monitoring operation. If the write cache is not disabled, a decision operation 706 determines whether the size of the cache is reduced. If the size of the cache is reduced, a disable operation 708 disables write operations to the write cache through a notification communicated to the CPU that writes to the write cache are not permitted. Then processing returns to a voltage monitoring operation. In another implementation, if the write cache is not disabled, the decision operation 706 may be bypassed, with the disable operation 708 proceeding.

If the size of the cache is not reduced, a disable operation 710 disables write operations to the write cache. In one implementation, write operations are disabled through a notification communicated to a CPU that writes to the write cache are not permitted. Next, a flush operation 712 flushes the write cache of its contents. In one implementation, the write cache is flushed by copying its contents to a storage medium, such as a hard disc, and deleting the contents from the write cache. Once the write cache is flushed, a reduce operation 714 reduces the size of the write cache. In one implementation, the physical size of the write cache does not change. Instead, an interface controller may only accept a reduced amount of data to be written to the write cache. In other words, if the interface controller reduces the size of the write cache from 8 MB to 256 KB, only 256 KB of data will be accepted for inclusion in the write cache. Once, the size of the write cache has been reduced, processing returns to a voltage monitoring operation.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A system comprising an interface controller configured to:
   alter a usable write cache size responsive to a voltage supply condition being less than a first threshold; and
   perform an action responsive to the voltage supply condition being less than a second threshold, where the second threshold is less than the first threshold, the action being at least one of disabling write operations to the write cache or flushing the write cache.

2. The system of claim 1, further comprising:
   memory storing a servo firmware configured to monitor the voltage supply condition.

3. The system of claim 2, wherein the interface controller is configured to send a sequential request to the servo firmware requesting the voltage supply condition.

4. The system of claim 2, wherein the servo firmware utilizes an analog-to-digital converter to monitor, at each of a plurality of servo wedges, the voltage supply condition.

5. The system of claim 3, wherein the servo firmware processes the sequential request before completing an existing concurrent request.

6. A method, comprising:
   altering a usable write cache size of a storage device responsive to a voltage supply condition being less than a first threshold; and
   disabling write operations to the write cache responsive to the voltage supply condition being less than a second threshold, wherein the second threshold is lower in magnitude than the first threshold.

7. The method of claim 6, wherein altering a cache size further comprises:
   disabling write operations of a host;
   moving data stored in the cache to a storage medium in the storage device;
   notifying the host of a reduced write cache size;
   limiting an amount of data writeable to the write cache to the reduced cache size; and
   re-enabling write operations of the host.

8. The method of claim 7, further comprising:
   moving data stored in the cache to a storage medium in the storage device responsive to the voltage supply condition being less than the second threshold.

9. The method of claim 7, further comprising:
   re-enabling write operations to the cache when the voltage supply condition increases above the second threshold.

10. The method of claim 7, further comprising:
    increasing the cache size when the voltage supply condition increases above the first threshold.

11. The method of claim 7, wherein the first threshold is between about 4.7 and about 4.5 volts and wherein the second threshold is between about 4.4 and about 4.2 volts.

12. The method of claim 6, further comprising:
    sending a sequential request to a servo firmware requesting the voltage supply condition.

13. The method of claim 12, further comprising:
    receiving the voltage supply condition from the servo firmware.

14. The method of claim 13, wherein the servo firmware processes the sequential request before completing an existing concurrent request.

15. The method of claim 6, further comprising:
notifying the host of a reduced write cache size; and
limiting an amount of data writeable to the write cache to the reduced cache size.

16. A method, comprising:
reducing from an original state a usable write cache size responsive to a voltage supply condition at or below a warning level threshold;
disabling the write cache responsive to the voltage supply condition at or below a danger level threshold, wherein the danger level threshold is lower in magnitude than the warning level threshold; and
returning the write cache and the write cache size to the original state responsive to the supply voltage condition above the warning level threshold.

17. The method of claim 16, wherein reducing the cache size further comprises:
notifying a host of a reduced cache size; and
limiting an amount of data writeable to the write cache not to exceed the reduced cache size.

18. The method of claim 16, further comprising:
transmitting a sequential request to a servo firmware requesting the voltage supply condition;
receiving the voltage supply condition responsive to the sequential request.

19. The method of claim 18, wherein the servo firmware processes the sequential request before completing an existing concurrent request.

20. A method, comprising:
altering a usable size of a cache in response to detecting a reduction in a power supply voltage level below a threshold; and
flushing the cache in response to detecting a reduction in the power supply voltage level below another threshold.

21. The method of claim 20, further comprising revoking a write permission to the cache in response to detecting the reduction in the power supply voltage level below the threshold.

* * * * *